(12) United States Patent
Galante et al.

(10) Patent No.: US 11,834,280 B2
(45) Date of Patent: Dec. 5, 2023

(54) METHOD FOR FORMING AND HANDLING COMPOUND PALLET UNITS, AND RELATED SYSTEM

(71) Applicant: Fameccanica.Data S.p.A., San Giovanni Teatino (IT)

(72) Inventors: Dario Galante, San Giovanni Teatino (IT); Nicola La Verghetta, San Giovanni Teatino (IT); Fabrizio Faieta, San Giovanni Teatino (IT)

(73) Assignee: Fameccanica.Data S.p.A., San Giovanni Teatino (IT)

( * ) Notice: Subject to any disclaimer, the term of this patent is extended or adjusted under 35 U.S.C. 154(b) by 0 days.

(21) Appl. No.: 17/954,404

(22) Filed: Sep. 28, 2022

(65) Prior Publication Data
US 2023/0098938 A1      Mar. 30, 2023

(30) Foreign Application Priority Data
Sep. 29, 2021   (EP) ..................... 21199995

(51) Int. Cl.
*B65G 61/00* (2006.01)
*B65G 57/24* (2006.01)
*B65G 43/08* (2006.01)

(52) U.S. Cl.
CPC ............. *B65G 57/24* (2013.01); *B65G 43/08* (2013.01); *B65G 61/00* (2013.01); *B65G 2201/0267* (2013.01)

(58) Field of Classification Search
CPC ........ B65G 57/24; B65G 43/08; B65G 61/00; B65G 2201/0267

USPC .......................................... 414/799; 198/435
See application file for complete search history.

(56) References Cited

U.S. PATENT DOCUMENTS

| 5,363,310 A | * | 11/1994 | Haj-Ali-Ahmadi | ........................ G06Q 10/087 705/28 |
| 6,571,860 B2 | * | 6/2003 | Hunter | ................... B22D 33/02 164/323 |
| 6,652,213 B1 | * | 11/2003 | Mitchell | .............. B65G 1/1375 414/284 |
| 7,699,158 B2 | * | 4/2010 | Aust | .................... B65G 47/643 198/369.1 |
| 9,617,082 B2 | * | 4/2017 | Baker | .................. B65G 1/1373 |

(Continued)

FOREIGN PATENT DOCUMENTS

| CN | 109693903 A | 4/2019 |
| EP | 0949169 A1 | 10/1999 |

(Continued)

OTHER PUBLICATIONS

European Search Report dated Feb. 23, 2022. 7 pages.

*Primary Examiner* — Lynn E Schwenning
(74) *Attorney, Agent, or Firm* — RMCK Law Group PLC

(57) ABSTRACT

A method and system for automatically forming and handling compound pallet units including a pallet and a plurality of products stacked on the pallet. The method includes the steps of providing a conveyor device, at least one loading area provided for automatically receiving empty pallets and temporarily hosting compound pallet units to be transferred to a main conveyor, and at least one manipulator robot configured for picking selected products and placing the products on a pallet stationing at said loading station.

12 Claims, 8 Drawing Sheets

(56) References Cited

U.S. PATENT DOCUMENTS

| | | | |
|---|---|---|---|
| 2003/0226739 A1* | 12/2003 | Goussev | B65G 35/08 |
| | | | 198/465.1 |
| 2006/0182545 A1 | 8/2006 | Ray et al. | |
| 2010/0068027 A1* | 3/2010 | Mitchell | B65G 61/00 |
| | | | 414/789.9 |
| 2011/0076128 A1 | 3/2011 | Johnsen et al. | |

FOREIGN PATENT DOCUMENTS

| | | | | |
|---|---|---|---|---|
| EP | 1669309 A1 | 6/2006 | | |
| EP | 3187440 A1 | 7/2017 | | |
| JP | H 05278854 | * 10/1993 | | B65G 47/52 |
| JP | H05278854 A | 10/1993 | | |

* cited by examiner

METHOD FOR FORMING AND HANDLING COMPOUND PALLET UNITS, AND RELATED SYSTEM

CROSS-REFERENCE TO RELATED APPLICATION

This application claims priority to European Patent Application No. 21199995.8 filed Sep. 29, 2021. The disclosure of the above application is incorporated herein by reference in its entirety.

FIELD OF THE INVENTION

The present invention relates in general to the field of logistics, in particular to the field of logistics in warehouses or plants for managing materials, components, boxes, etc.

More specifically, the invention relates to a method for forming and handling compound pallet units comprising a pallet and a plurality of products stacked on the pallet.

Embodiments of the present invention also relate to a system for forming and handling compound pallet units.

DESCRIPTION OF THE RELATED ART

To date, logistics activities related to managing packages and boxes to be delivered to respective destinations are substantially totally entrusted to manual operations carried out by trained operators. The products to be delivered (for example packages and boxes) are stacked at pick-up stations, in which a human operator reads a barcode through a barcode reader, or visually reads a label, and manually grasps the product to be delivered to a specific shipping area.

Usually, the products are positioned on pallets for making easier the transport of the products, again by human operators, to the shipping areas.

In this connection, a compound pallet unit comprises a pallet, having a pallet base and a plurality of products stacked on the pallet base.

A pallet is a transport structure, which supports goods in a stable fashion, while being lifted by a fork lift, a pallet jack, a front loader, a jacking device, or an erect crane. The pallet base is the structural foundation of the product load which allows handling and storage efficiencies. Goods or shipping containers are often secured on the pallet base with strappings, stretch wrap or shrink wrap.

The main drawback of the known solutions is given by the fact that the operations are substantially totally manual, therefore subjected to mistakes and requiring proper training for the operators, without ensuring high repeatability and reliability of the operations. Furthermore, these solutions cause non-ergonomic actions to be carry out by the operators.

OBJECT AND SUMMARY OF THE INVENTION

The object of the present invention is to provide a system and a method for forming and handling compound pallet units which overcome the problem and limitations of the prior art.

In accordance with the present invention, this object is achieved by a method having the features of claim 1 and by a system having the features of claim 11.

Optional features of the invention form the subject of the dependent claims.

The claims are an integral part of the disclosure submitted in relation to the invention.

According to another aspect, the invention also relates to a computer program product, including software code portions for performing a method for forming and handling compound pallet units.

BRIEF DESCRIPTION OF THE DRAWINGS

Further characteristics and advantages of the invention will become clear from the following description, given purely as a non-limiting example, with reference to the attached drawings, wherein.

DETAILED DESCRIPTION

Figure 1:
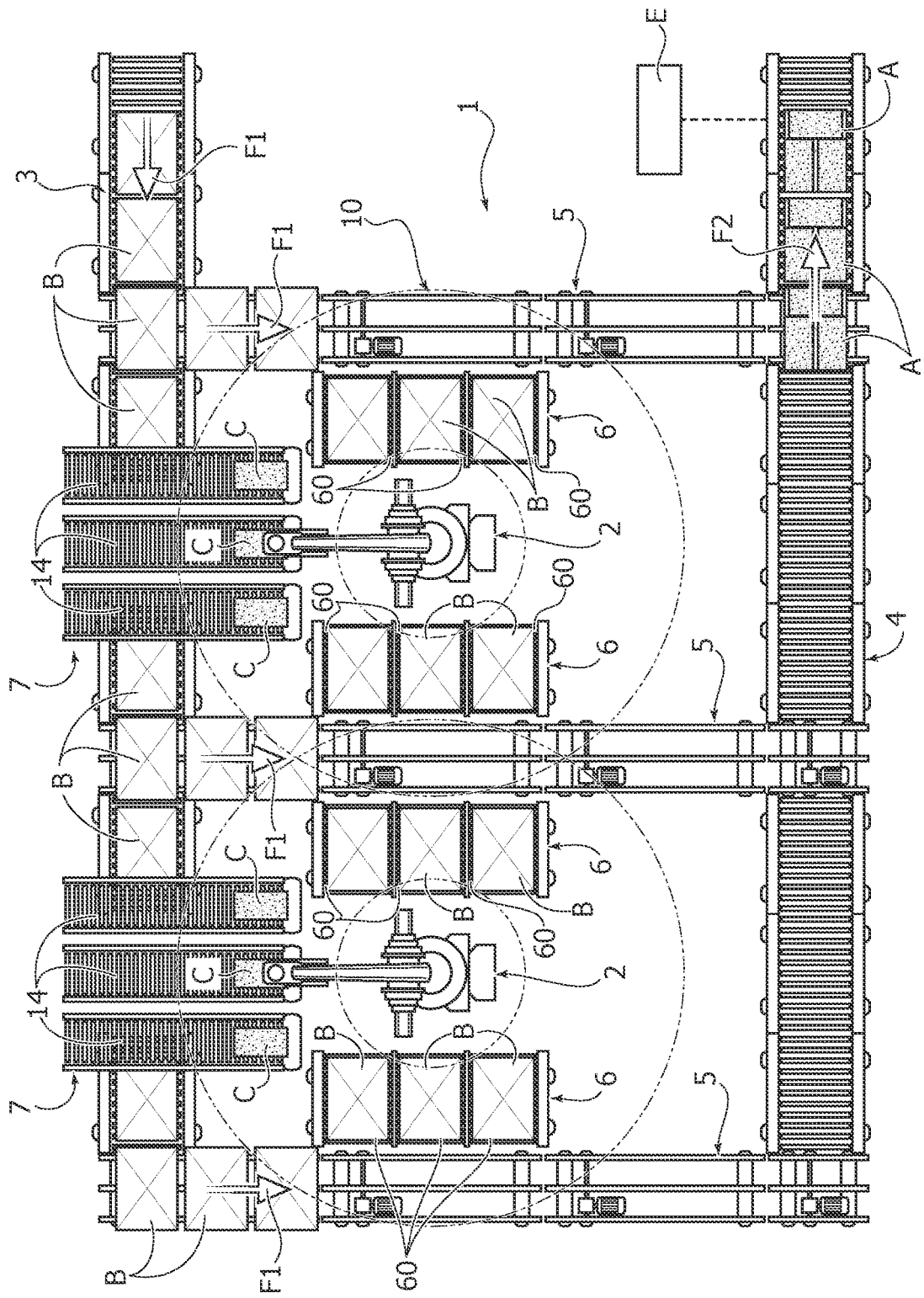
FIGS. 1,2 are schematic plan views of an automatic palletizing system for forming and handling compound pallet units, according to different embodiments of the present invention.

With reference to FIG. 1, numeral reference 1 indicates an automatic palletizing system for forming and handling compound pallet units A. The compound pallet units A comprises a pallet B having a pallet base, and a plurality of products C stacked on the pallet B. In the example shown in the drawings, the products C are packages—for example containing consumer products —. Naturally, the present invention is also applicable to any kind of products C having different shape and size with respect to those illustrated in the figures.

The automatic palletizing system 1 comprises a conveyor device 10 provided for automatically moving a plurality of pallets B and compound pallet units A from one location to another. By way of non-limiting example, the figures refer to a conveyor device of the motor-driven-chain type.

The conveyor device 10 comprises a first conveyor branch 3 configured for automatically transferring a plurality of empty pallets B intended to be loaded with one or more products C for forming compound pallet units A. The conveyor device 10 comprises a second conveyor branch 4 configured for automatically transferring a plurality of formed compound pallet units A, once several loading operations are carried out. The first and second conveyor branches 3,4 are provided for optimizing the conveying flow from/to respective storage areas.

According to the invention, the conveyor device 10 comprises at least one intermediate conveyor branch 5 connected to said first and second conveyor branches 3,4. In the embodiment shown in FIG. 1, the conveyor device 10 has a specular structure, having the intermediate conveyor branch 5 spaced perpendicularly with respect to said first and second conveyor branches 3,4, in which respective ends of the intermediate branch 5 are connected to the first and second conveyor branches 3,4, to form a single continuous line of automation.

In the embodiment shown in FIG. 2—as explained more in detail in the following—the first and second branches 3,4 are vertically overlapped and the intermediate branch 5 provide two branches at different heights respectively connected with the first and second branches 3,4.

As explained more in detail in the following, the aforementioned at least one intermediate conveyor branch 5 is provided for enabling simultaneous circulation of both empty pallets B to be loaded and formed compound pallet units A to be delivered to a proper final destination.

According to a preferred embodiment shown in the figures, the conveyor device 10 comprises a plurality of intermediate conveyor branches 5 parallel to and spaced apart from each other, having respective ends connected respectively with said first and second conveyor branches 3,4. As illustrated in FIG. 2, also in the case of the overlapped first and second branches 3,4, the conveyor device 10 may comprise multiple parallel intermediate branches 5, so as to maximize efficiency of the forming and handling cycle.

According to an important feature of the invention, the automatic palletizing system 1 comprises at least one loading area 6 operatively connected with said at least one intermediate conveyor branch 5. The loading area 6 comprises at least one loading station 60 provided for automatically receiving empty pallets B from the first conveyor branch 3, via the intermediate conveyor branch 5, and temporarily hosting compound pallet units A to be transferred to the second conveyor branch 4, via the intermediate conveyor branch 5. Preferably, each loading area 6 comprises a plurality of said loading stations 60 for respectively receiving one empty pallet B. By way of the non-limiting example of the figures, each loading area 6 comprises three loading stations 60, in such a way that each loading area 6 is configured for simultaneously temporarily hosting three pallets B.

According to preferred arrangements of the invention shown in the figures, one or more intermediate conveyor branches 5 are operatively connected with at least one loading area 6, provided on opposite sides of the intermediate conveyor branch 5. According to the embodiment of FIG. 1, the loading areas 6 are operatively connected to the intermediate conveyor branches 5 at a middle portion of the intermediate conveyor branch 5, located substantially at the same distance from the first conveyor branch 3 and the second conveyor branch 4. As indicated in the following, the conveyor device 10 comprises shifting means 9 for automatically transversely shifting the pallets B from the intermediate conveyor branch 5 towards one loading station 60, and vice-versa.

According to a further important feature of the invention, the automatic palletizing system 1 comprises at least one manipulator robot 2 associated with said at least one loading area 6.

The manipulator robot 2 is configured for picking products C from a picking area 7, placing the products C on a pallet B temporarily stationing at one of the loading stations 60. According to preferred embodiments shown in the figures, the manipulator robot 2 is associated with different loading areas 60, so as to be configured for placing picked products C on several loading areas 6. With reference to a preferred arrangement in which a number of parallel intermediate branches 5 are provided, the manipulator robots 2 may be provided respectively at the space between two loading areas 6 provided at a respective side of different intermediate branches 5. The manipulator robot 2 may be provided according to different solutions, such as picking tools mounted at a wrist of a robot, such as cartesian robots, Scara robots, anthropomorphic robots etc.

The automatic palletizing system 1 comprises at least one electronic control unit E (illustrated in FIGS. 1,2,6) configured to control the operations for forming and handling compound pallet units A. Naturally, the system 1 may comprise a plurality of control units in communication to each other, for respectively driving different operations of the forming and handling cycle.

According to the invention, the electronic control unit E is configured for enabling a simultaneous circulation of both empty pallets B and formed compound pallet units A (see arrows F1, F2 in FIGS. 1-6). Therefore, the electronic control unit E is configured to simultaneously control the handling of empty pallets B from the first conveyor branch 3 to one loading area 6, passing through one intermediate conveyor branch 5, and the handling of formed compound pallet units A from one loading area 6 to the second conveyor branch 4, passing through the intermediate conveyor branch 5. § After the loading operations at the loading areas 6, the formed compound pallet units A moves on the second conveyor branch 4 towards a proper delivery destination (not illustrated in the drawings), according to the type of products C carried by the pallet B.

Figure 6:
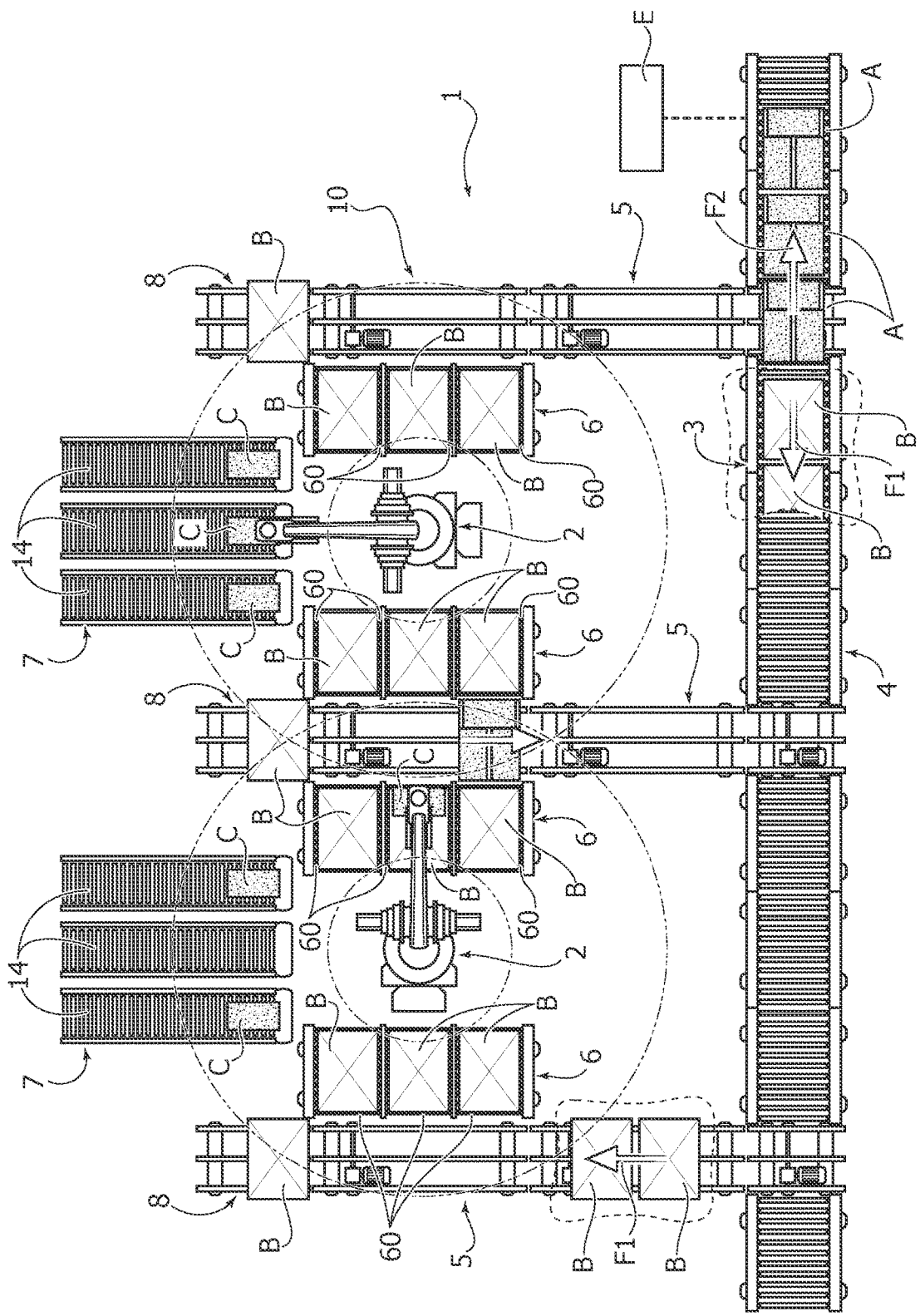
FIG. 6 is a schematic plan view showing a further method step according to the present invention.

The electronic control unit E is further configured to send a command signal to the manipulator robots 2 for driving the operation of placing a picked product C on a determined pallet B available at a determined loading station 60 (FIG. 6). In this connection, the electronic control unit E is configured for selecting a determined pallet B for placing the picked product C, based on an automated evaluation criteria which considers an information related to the picked product C, the intended delivery destination of the picked product C and eventual other products C previously stacked on one pallet B still stationing at one loading area 6. As explained in detail in the following, the information related to the picked product C may be acquired through reading a barcode present on the product C, before picking it. When a plurality of pallets B temporarily stays at respective loading stations 60 (with respective products C already stacked on the pallets B) still waiting for the complete loading, the electronic control unit E will address the robot 2 to place the current picked product C on a specific pallet B, in case of common delivery destination between the products C stacked on that pallet B and the current picked product C. In other words, the robot 2 gives priority for placing a picked product C, to the pallet B already carrying products C with the same destination.

If all the pallets B stationing at the loading areas 6 accessible by one manipulator robot 2 are completely empty, the electronic control unit E may address the robot 2 to place the current picked product C on the pallet B that is closest to the robot 2.

In one or more embodiments, the electronic control unit E is configured to synchronize the occupation of an empty loading station 60 with a new empty pallet B to be loaded and the transfer of the formed compound pallet unit A from one loading station 60 to the intermediate conveyor branch 5, so as to optimize the forming and handling cycle. In this connection, the system 1 may provide a buffer of empty pallets B waiting to find a collocation on an empty loading station 60. In one or more embodiments—as explained in the following—the buffer of empty pallets B is created directly on a conveyor branch 3,5 without requiring different structures specifically provided for this purpose.

Figure 2:
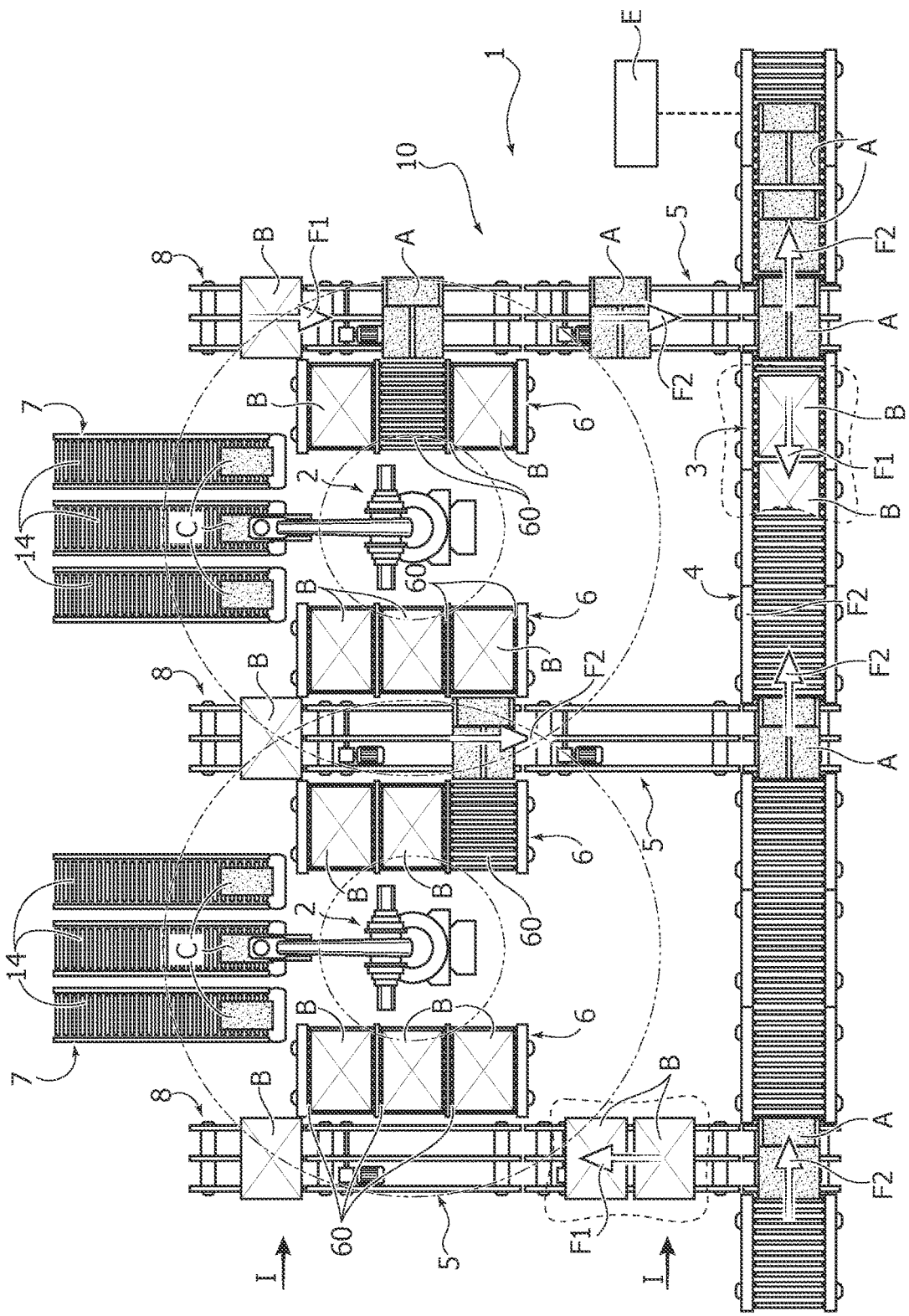

FIG. 2 is a schematic plan view of a preferred embodiment of the automatic palletizing system 1. According to this embodiment the first and second conveyor branches 3,4 are parallel and overlapped to each other and the intermediate conveyor branch 5 comprises an intermediate lower branch 5' and an intermediate upper branch 5", respectively connected to said first and second conveyor branches 3,4. In other words, according to this embodiment, the conveyor device 10 comprises two branches 3,5' and 4,5" spaced at different heights with respect to each other. Preferably, the branch 3,5' for automatically transferring empty pallets B is spaced at a lower height with respect to the branch 4,5" for transferring compound pallet units A, considering that the overall height of compound pallet unit A is much greater than that of an empty pallets B.

According to this embodiment, the system 1 comprises respective lifting devices 8 located at a terminal portion of respective intermediate conveyor branches 5, for moving the empty pallets B from said intermediate lower branch 5' to the intermediate upper branch 5", towards the loading area 6. Naturally this principle can be applicable also to the case in which the lift device 8 is provided for lifting compound pallet units A from the lower branch 5' towards the upper branch 5". The lift device 8 may be provided with a pantograph structure having a platform for receiving the pallets B, automatically movable along a vertical direction both upwards and downwards.

Figure 3:
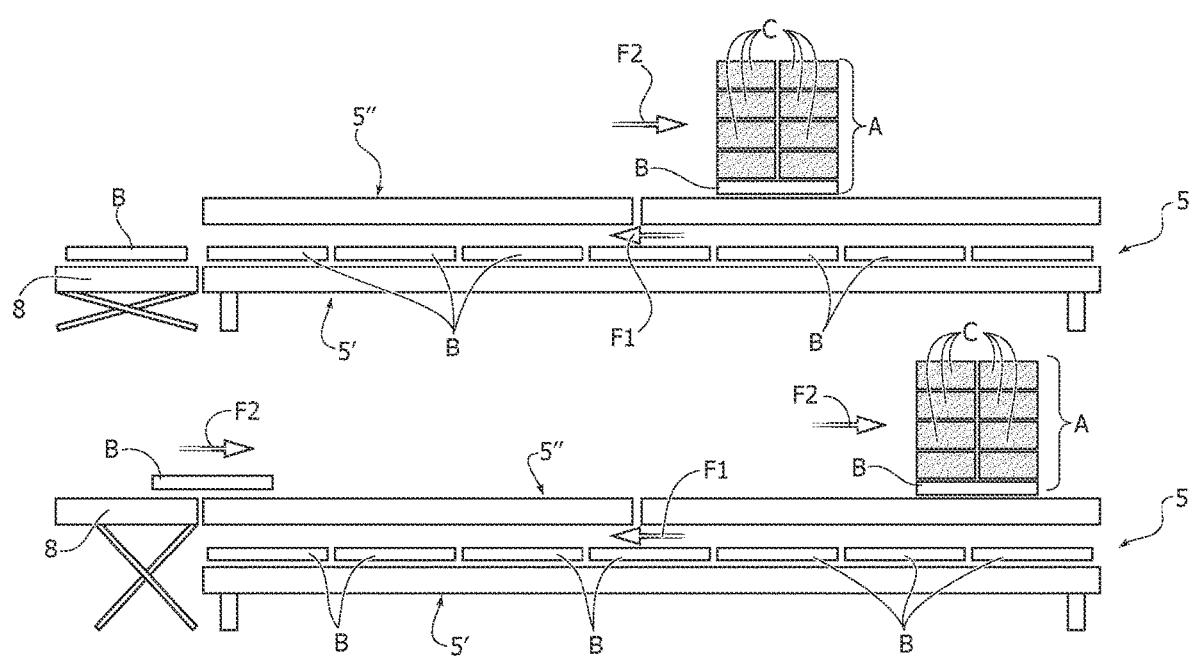
FIG. 3 is a schematic side view of a specific area of the system indicated by the arrows I in FIG. 2, FIGS. 4a-4b are plan views showing enlarged details of the system illustrated in FIG. 2, FIGS. 4c-4e are schematic side views of the features indicated by the arrows II in FIGS. 4a, 4b, FIGS. 5a-5b are plan views showing further details of the system illustrated in FIG. 2, FIGS. 5c-5d are schematic side views of the features indicated by the arrows III in FIGS. 5a, 5b.

FIG. 3 is a schematic side view of a specific area of the system 1 indicated by the arrows I in FIG. 2, showing lift devices 8.

According to the embodiment illustrated in FIGS. 2,3, the electronic control unit E is programmed for enabling simultaneous circulation of the empty pallets B and compound pallet units A in two opposite directions F1,F2 on the conveyor device 10.

The electronic control unit E may be further configured to control the circulation of the empty pallets B, so as to modulate the transfer rate of the empty pallets B towards the loading areas 6, according to the availability of empty loading stations 60. According to this feature, FIG. 3 shows a continuous row of empty pallets B stationing at the intermediate lower branch 5' waiting to be transferred to the intermediate upper branch 5" as a function of the releasing operation of the compound pallet units A from the loading stations 60. Due to this feature, it is possible to obtain a flexible and efficient circulation of pallets B, without causing cycle downtimes or providing specific structures for hosting the empty pallets B before the execution of the loading operations.

FIGS. 4a-4e show further details of the operations for transferring an empty pallet B from the intermediate conveyor branch 5 to the loading station 60 and, similarly, FIGS. 5a-5d show the operation of transferring a compound pallet unit A from the loading station 60 to the intermediate conveyor branch 5.

As previously indicated, the loading areas 6 may comprise a plurality of loading stations 60 operatively connected with a respective intermediate conveyor branch 5. The loading areas 6 are located at a respective side of one intermediate conveyor branch 5.

For enabling the transfer from the intermediate conveyor branch 5 to a loading station 60 and vice-versa, the conveyor device 10 comprises shifting means 9 associated with the intermediate conveyor branch 5 for enabling transversally shifting of empty pallets B from the intermediate conveyor branch 5 to the loading station 6 and of compound pallet units A from the loading station 60 to the intermediate conveyor branch 5.

With reference to FIGS. 4a-4e, the shifting means 9 comprise at least one auxiliary roller conveyor 11 provided at a specific section of the intermediate conveyor branch 5, configured for transversally sliding one pallet B, along a transversal direction with respect to the conveying direction of the intermediate conveyor branch 5. In this connection, the auxiliary roller conveyors 11 are located at sections of the intermediate conveyor branch 5, adjacent with a respective loading station 60, so as to enable the transverse shifting of the pallets B from the intermediate conveyor branch 5 to a proper loading station 60.

Figure 4A:
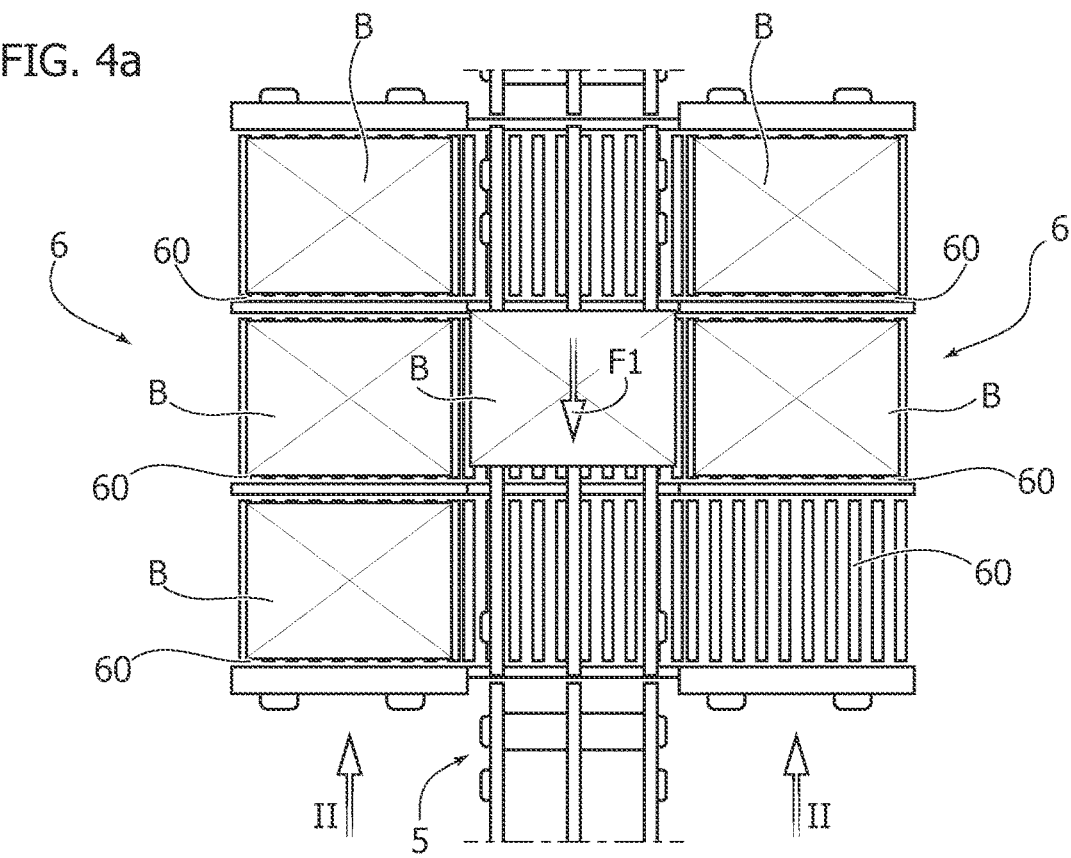
Figure 4B:
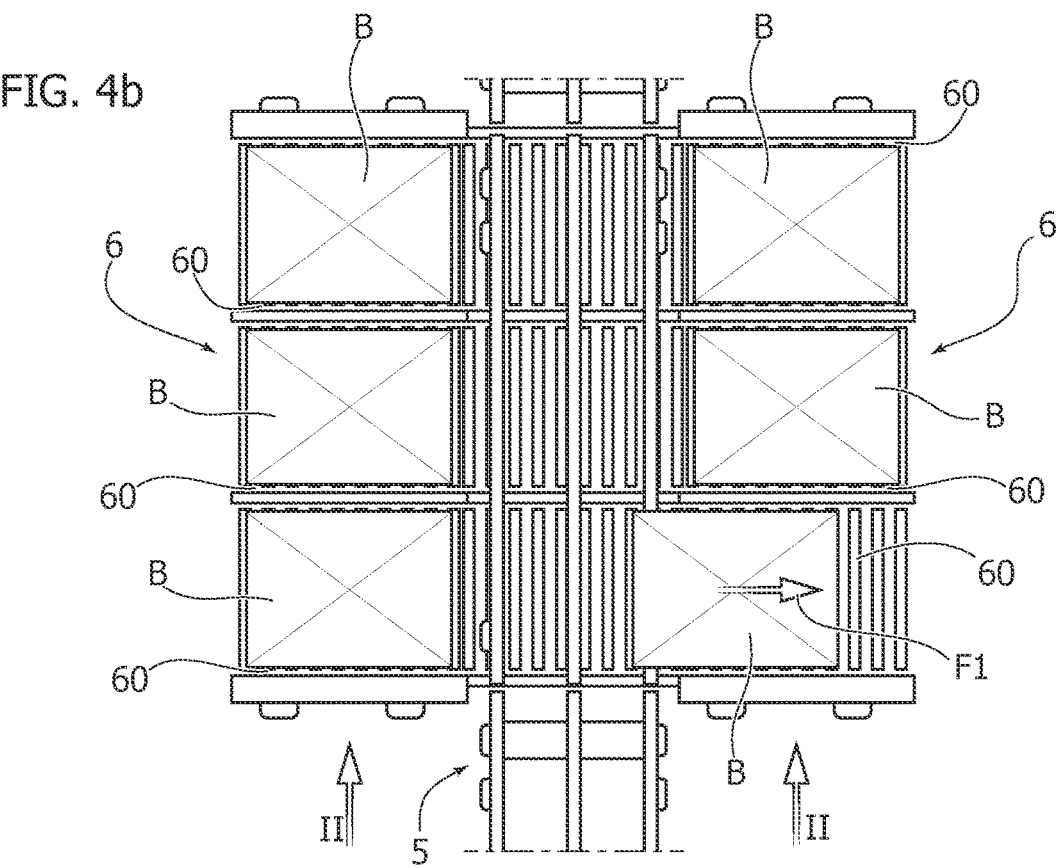
Figure 4C:
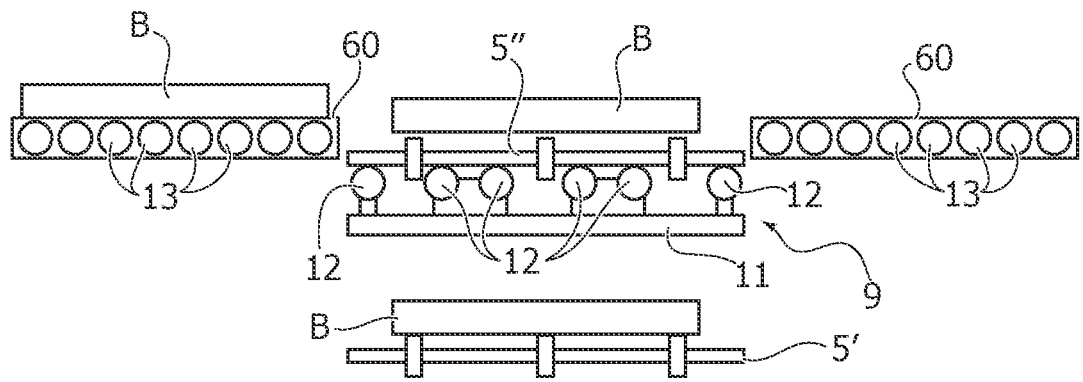
Figure 4D:
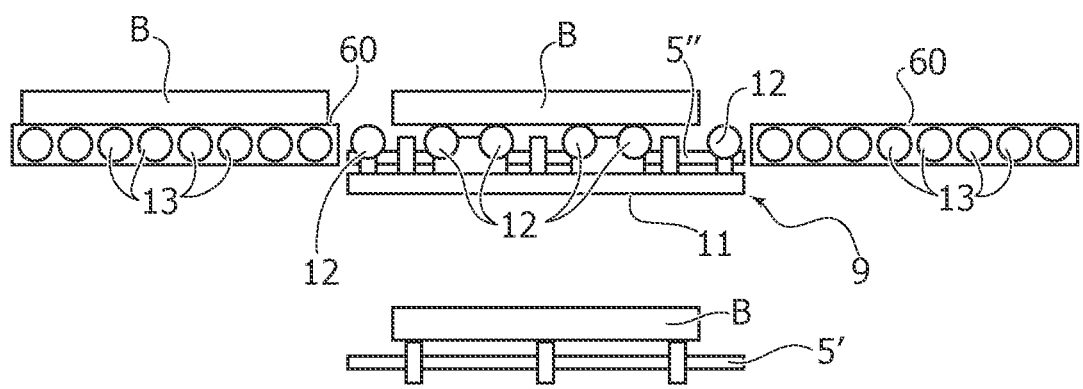
Figure 4E:
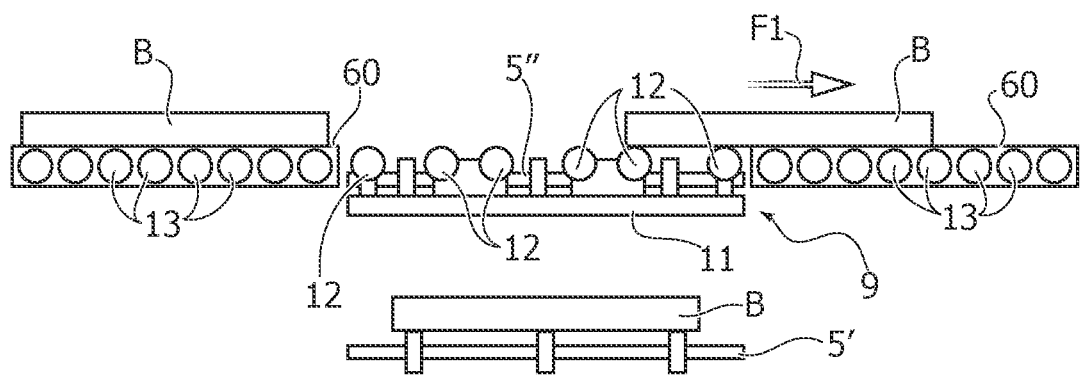
Figure 5A:
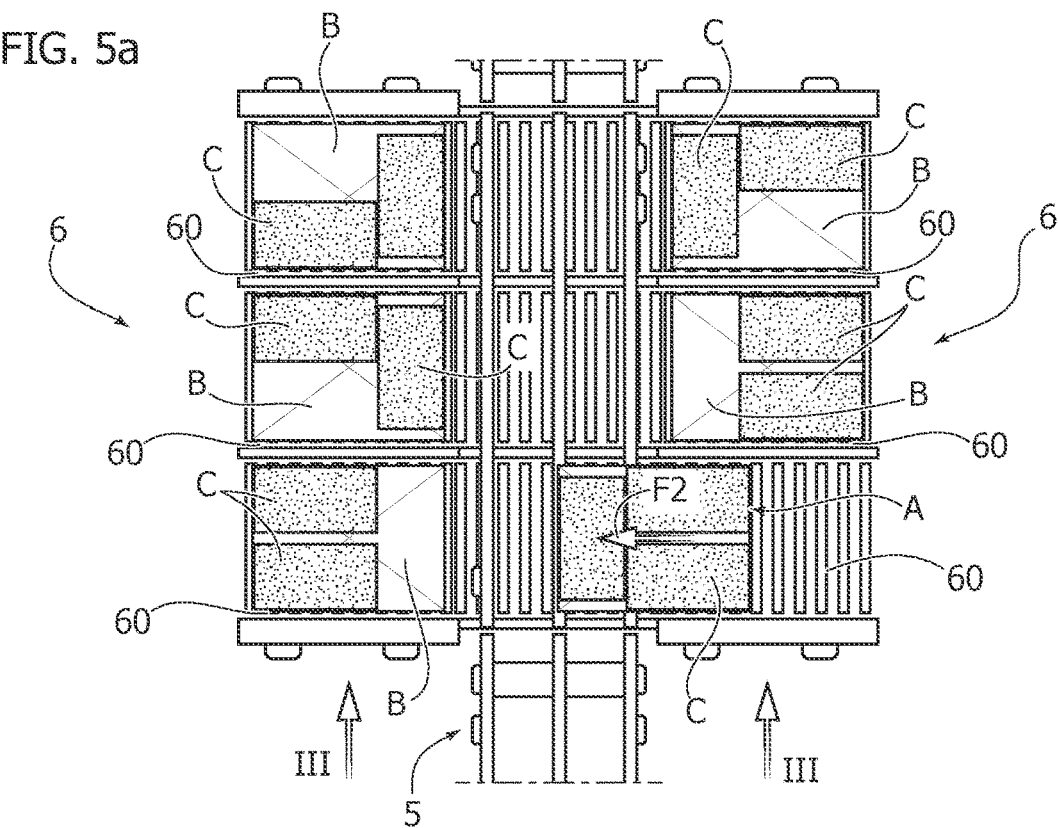
Figure 5B:
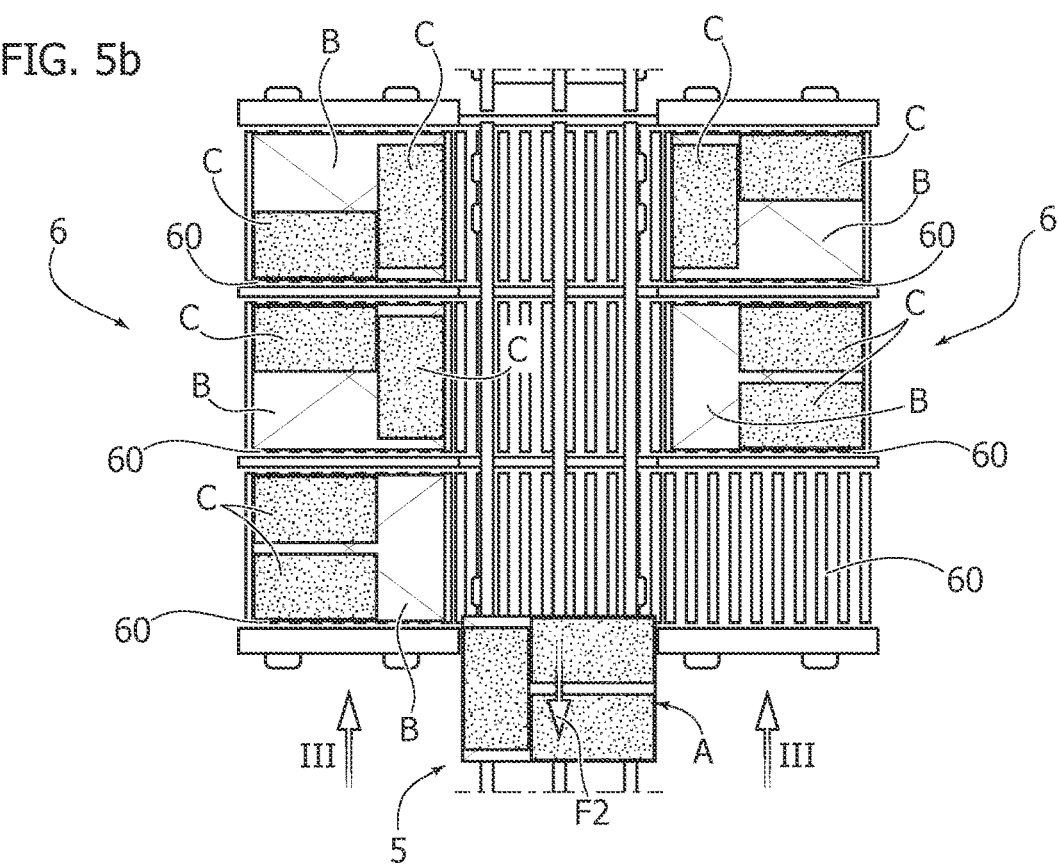
Figure 5C:
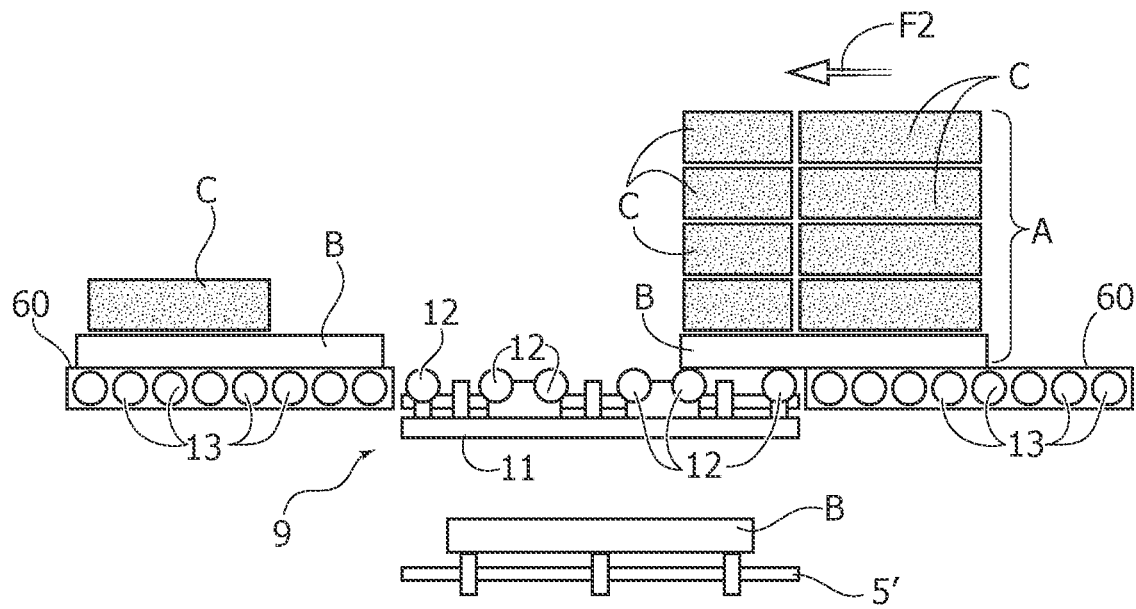
Figure 5D:
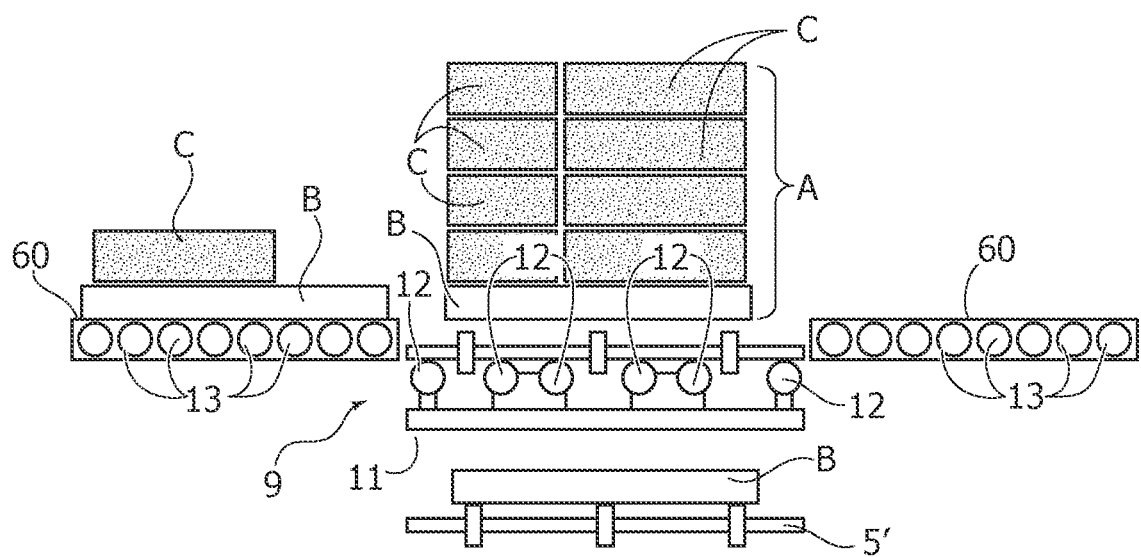

FIGS. 4c-4e are schematic side views of the features indicated by the arrows II in FIGS. 4a,4b.

As illustrated, the auxiliary roller conveyor 11 is controlled for being moved between a passive position (FIG. 4c) in which it does not interfere with the conveying of the pallets B on the intermediate conveyor branch 5, and an active position (FIGS. 4d,4e) in which it interrupts the longitudinal transport of the pallet B along the intermediate conveyor branch 5 and drives a transverse movement to the pallet B. Preferably, the passive position is achieved by providing the support surface of the auxiliary roller conveyor 11 at a lower height than the level of the intermediate conveyor branch 5 (so as to not interfere with the longitudinal path of the pallets B). Following an activation signal (given by the electronic control unit E), the auxiliary roller conveyor 11 is moved upwards, towards the support surface of the intermediate conveyor branch 5, so as to arrange transversal rollers 12 at the level of the intermediate conveyor branch 5, and thus coming into contact with the lower surface of the pallets B. In other words, the active position of the auxiliary roller conveyor 11 provide a continuous transport surface with the surface of the loading station 60, allowing transversely sliding to/from the loading station 60. As shown in FIGS. 4d-4e, in the active position, the rollers 12 of the auxiliary roller conveyor 11 can be arranged at empty spaces of the support surface of the intermediate branch 5. In order to complete the transfer of the pallets B on the loading station 60, also the surface of the loading stations 60 may be provided with motorized transversal roller conveyors 13. According to the features indicated above, the electronic control unit E may be configured for enabling the movement of the shifting means 9 after identifying the proper loading station 60 for a determined pallet B.

Similarly, FIGS. 5a-5d show the operation of transferring a compound pallet unit A from the loading station 60 to the intermediate conveyor branch 5, once the loading operations are completed. In this case, the auxiliary roller conveyor 11 is provided—in the active position—at the level of the loading stations 60, for enabling sliding of a compound pallet unit A towards the intermediate conveyor branch 5, and then driven at a passive position for enabling the longitudinal conveying along the intermediate conveyor branch 5. In this case, the electronic control unit E may be configured for enabling the movement of the shifting means 9 after identifying the full loading condition of a determined pallet B stationing at the loading station 60.

Due to the features indicated above, the transverse shifting to/from the loading area 6 is carried out without interrupting the longitudinal conveying along the intermediate branches 5.

Naturally, the shifting means 9 may be provided with different arrangements departing from those illustrated in the figures.

FIG. 6 is a plan view of the system 1, showing the step of loading an empty pallet B temporarily hosted at a loading station 60, by means of one manipulator robot 2. The entire process for managing the products C is carried out through a series of totally automated operations that guarantee proper handling of the products C without the human intervention.

The method for managing the products C and forming the compound pallet units A comprises the following steps:

reading a barcode or a label of one product C to be picked-up by the manipulator robot 2. The operation of reading the label can be carried out through an automatic reading system (barcode reader) mounted at a determined position in front of a picking area 7 where the products C are stored. Alternatively, the reading system may be mounted directly on-board of the manipulator robot 2, for example at a robot wrist close to the picking tool, so as to approach the product C to be carried out, carrying out the reading operation, moving the tool for picking the product C and thus bearing it towards a loading area 6. In one or more embodiments, the picking area 7 may be a storage device 14 having idler rollers.

Once the reading system has identified a delivery destination through the barcode (or other information sources) present on the product C, the electronic control unit E verifies which station 60 is relative to the destination identified. Naturally, this operation can be controlled by a further control system in communication with the electronic control unit E.

If a station 60 reserved for the destination of the product C just identified does not yet exist, the control unit E defines one of the stations 60 with an empty pallet B as the one reserved for the requested destination.

The manipulator robot 2 grabs the products C through an end of arm tool. The manipulator robot 2 is configured for being adapted to carry out products C from multiple picking areas 7.

The manipulator robot 2 may be provided for moving the product C towards the identified loading area 6 and for checking the current height of all the columns that are on the pallet B to be loaded. Once the height of the columns has been identified, the manipulator robot 2 identifies the specific point for placing the product C so as to optimize the release operation and minimize the cycle time. Once the release point has been identified, the manipulator robot 2 place the product C and after releasing it moves to an outer position in order to repeat the cycle. The operation of evaluating the heights of the columns may be carried out through a suitable sensor provided on-board of the robot 2. The operation may be carried out following an access request by means of an operator, since the height of a destination point may change.

Operation of the automatic palletizing system 1 according to the invention will now be described. Reference shall be made to all of the figures as they illustrate different arrangements of the conveyor branches adapted to carry out the following operations.

The empty pallets B and the compound pallet units A are respectively transported by the first and second conveyor branches 3,4. The intermediate conveyor branch 5 enables simultaneous circulation of both empty pallets B to be loaded and formed compound pallet units A to be delivered to a proper final destination. In case of multiple intermediate branches 5, the empty pallets B travelling on the first branch 3 are directed to a proper intermediate branch 5, according to the availability for receiving further empty pallets B. The electronic control unit E receives a signal related to a request for transferring an empty pallet B on a loading station 60. The empty pallet B is released from the current waiting location (at a proper position on the intermediate conveyor branch 5, for example waiting to be lifted via the lift device 8). The intermediate conveyor branch 5 moves the pallet B to the position previously requested. Once the empty pallet B is arrived at a determined position on the intermediate conveyor branch 5, adjacent to a loading station 60, the shifting means 9 are activated for enabling the movement of the pallet transversally (right or left) depending on the required station 60, as shown in FIGS. 4a-4e. When a compound pallet unit A has been formed—once the loading operations are completed by means of the manipulator robot 2 —, the following steps are carried out in order to send the compound pallet unit A to a final destination. The loading station 60 send a signal to the electronic control unit E requesting the shipment of the compound pallet unit A. The shifting means 9 are activated for shifting the compound pallet unit A on the intermediate conveyor branch 5. The intermediate conveyor branch 5 moves the compound pallet unit A towards the second conveyor branch 4 for reaching the final destination. The final destination can be shared with other compound pallet unit A in order to minimize the equipment required.

As compared to the prior art the method and system 1 according to the present invention have the following advantages:

all the operations for forming and moving the compound pallet unis are totally automated, ensuring high repeatability and reliability of the operation, ensuring quick automated operations for handling the compound operations, modulating the operations according to the type of products and their intended delivery destination.

Of course, without prejudice to the principle of the invention, the details of construction and the embodiments can be widely varied with respect to those described and illustrated, without thereby departing from the scope of the invention as defined by the claims that follow.

The invention claimed is:

1. A method for automatically forming and handling compound pallet units comprising a pallet and a plurality of products stacked on the pallet, wherein the method comprises;

providing a conveyor device having a plurality of conveyor branches for automatically transferring a plurality of empty pallets and a plurality of said compound pallet units, wherein the conveyor device comprises:

a first conveyor branch configured for automatically transferring the plurality of empty pallets, a second conveyor branch configured for automatically transferring the plurality of said compound pallet units, at least one intermediate conveyor branch connected to said first and second conveyor branches, configured for automatically transferring both empty pallets of the plurality of empty pallets and compound pallet units of the plurality of compound pallet units, providing at least one loading area comprising at least one loading station operatively connected with said conveyor device and provided for automatically receiving empty pallets and temporarily hosting compound pallet units to be transferred to the conveyor device, providing at least one manipulator robot configured for picking selected products of the plurality of products from a picking area, and placing the selected products on the pallet stationed at said at least one loading station, providing an electronic control unit in communication with at least said conveyor device and said at least one manipulator robot, the electronic control unit is programmed to control operations of at least the conveyor device and the at least one manipulator robot for the forming and handling of the compound pallet units, wherein the electronic control unit is programmed to simultaneously control handling of empty pallets from the first conveyor branch to one of the at least one loading area while handling formed compound pallet units from another one of the at least one loading area to the second conveyor. thereby driving simultaneous automatic circulation of both empty pallets and compound pallet units on said conveyor device and operations of said at least one manipulator robot, so as to provide a single palettizing cycle comprising product handling operations for forming the compound pallet units and conveying operations for moving the empty pallets and the compound pallet units, providing the first and second conveyor branches parallel and overlapped to each other, the at least one intermediate branch comprising an intermediate lower branch and an intermediate upper branch respectively connected to said first and second conveyor branches, and conveying simultaneously empty pallets and compound pallet units in two opposite directions on the at least one intermediate conveyor branch.

2. The method of claim 1, comprising automatically selecting a determined pallet for placing the picked selected product based on an automated evaluation criteria which considers at least one information related to the picked selected product and/or an intended delivery destination of the picked selected product and/or eventual pallets available for loading at said at least one loading area and/or eventual other products of the plurality of products previously stacked on one pallet still stationed at said at least one loading area.

3. The method of claim 1, comprising the step of synchronizing a time at which an empty loading station is occupied by a new empty pallet to be loaded with a time at which a formed compound pallet unit is transferred from one loading station to the conveyor device, so as to optimize a cycle of the forming and handling.

4. The method of claim 1, comprising:
providing shifting means for enabling transversally shifting of empty pallets and/or compound pallet units to/from the at least one loading station, and
driving the shifting means between a passive position in which it does not interfere with a longitudinal conveying direction of pallets, and an active position in which it interrupts transport of pallets and drives a transverse movement of pallets.

5. The method of claim 1, wherein the conveyor device comprises a plurality of said at least one intermediate conveyor branches parallel to and spaced apart from each other, having respective ends connected with said first and second conveyor branches.

6. The method of claim 1, wherein one of the at least one intermediate conveyor branches is operatively connected with one of the at least one loading areas provided at opposite sides of the one intermediate conveyor branch.

7. The method of claim 1, comprising:
providing said first conveyor branch for automatically transferring the plurality of empty pallets spaced at a lower height with respect to the second conveyor branch for transferring the plurality of compound pallet units, providing a lift device at a terminal portion of the at least one intermediate conveyor branch, and
lifting empty pallets from said intermediate lower branch to the intermediate upper branch, towards the at least one loading area.

8. The method of claim 1, comprising the step of controlling a buffer of empty pallets waiting to find a collocation on an empty loading station of the at least one loading station, the buffer of empty pallets being created directly on a conveyor branch of the plurality of conveyor branches.

9. A computer program product, directly loadable in a memory of at least one computer and including software code portions for performing the method of claim 1.

10. An automatic palletizing system for forming and handling compound pallet units comprising a pallet and a plurality of products stacked on the pallet, wherein the automatic palletizing system comprises:

a conveyor device having a first conveyor branch configured for automatically transferring a plurality of empty pallets, a second conveyor branch configured for automatically transferring a plurality of said compound pallet units, and at least one intermediate conveyor branch connected to said first and second conveyor branches, at least one loading area comprising at least one loading station, operatively connected with said intermediate conveyor branch and provided for automatically receiving empty pallets of the plurality of empty pallets from said first conveyor branch via the at least one intermediate conveyor branch and temporarily hosting compound pallet units of the plurality of compound pallet units to be transferred to said second conveyor branch, via the at least one intermediate conveyor branch, at least one manipulator robot associated with said at least one loading area, configured for picking products of the plurality of products from a picking area, and placing the picked products on a pallet stationed at said at least one loading station, and an electronic control unit in communication with at least said conveyor device and said at least one manipulator robot, the electronic control unit is programmed to control operations of at least the conveyor device and the at least one manipulator robot for the forming and handling of the compound pallet units, wherein the electronic control unit is programmed to simultaneously control handling of empty pallets from the first conveyor branch to one of the at least one loading area while handling formed compound pallet units from another one of the at least one loading area to the second conveyor, thereby for driving simultaneous circulation of empty pallets and compound pallet units on different sections of said at least one intermediate conveyor branch, and operations of said at least one manipulator robot, so as to provide a single palettizing cycle comprising product handling operations for forming the compound pallet units and conveying operations for moving the empty pallets and the compound pallet units, wherein said first and second conveyor branches are parallel and overlapped to each other, the at least one intermediate branch comprising an intermediate lower branch and an intermediate upper branch respectively connected to said first and second conveyor branches, the system comprising at least one lift device at a terminal portion of a respective intermediate conveyor branch, for lifting the empty pallets from said intermediate lower branch to the intermediate upper branch, towards the at least one loading area.

11. The system of claim 9, comprising shifting means for enabling transversally shifting of empty pallets and/or compound pallet units to/from the at least one loading station, the shifting means being controlled between a passive position in which it does not interfere with a longitudinal conveying direction of pallets, and an active position in which it interrupts transport of pallets and drives a transverse movement of pallets.

12. The system of claim 10, wherein the at least one intermediate conveyor branch comprises a plurality of said intermediate conveyor branches parallel to and spaced apart from each other, having respective ends connected with said first and second conveyor branches.

\* \* \* \* \*

UNITED STATES PATENT AND TRADEMARK OFFICE
CERTIFICATE OF CORRECTION

PATENT NO. : 11,834,280 B2
APPLICATION NO. : 17/954404
DATED : December 5, 2023
INVENTOR(S) : Dario Galante, Nicola La Verghetta and Fabrizio Faieta Page 1 of 1

It is certified that error appears in the above-identified patent and that said Letters Patent is hereby corrected as shown below:

On the Title Page

(71) Applicant address information should be listed as:
- Fameccanica.Data S.p.A., San Giovanni Teatino (Chieti), ITALY -

(72) Inventor address information should be listed as:
- Dario GALANTE, San Giovanni Teatino (Chieti), ITALY -
- Nicola LA VERGHETTA, San Giovanni Teatino (Chieti), ITALY -
- Fabrizio FAIETA, San Giovanni Teatino (Chieti), ITALY -

(73) Assignee address information should be listed as:
- Fameccanica.Data S.p.A., San Giovanni Teatino (Chieti), ITALY -

Signed and Sealed this
Twenty-fifth Day of February, 2025

Coke Morgan Stewart
*Acting Director of the United States Patent and Trademark Office*